Figure 1:
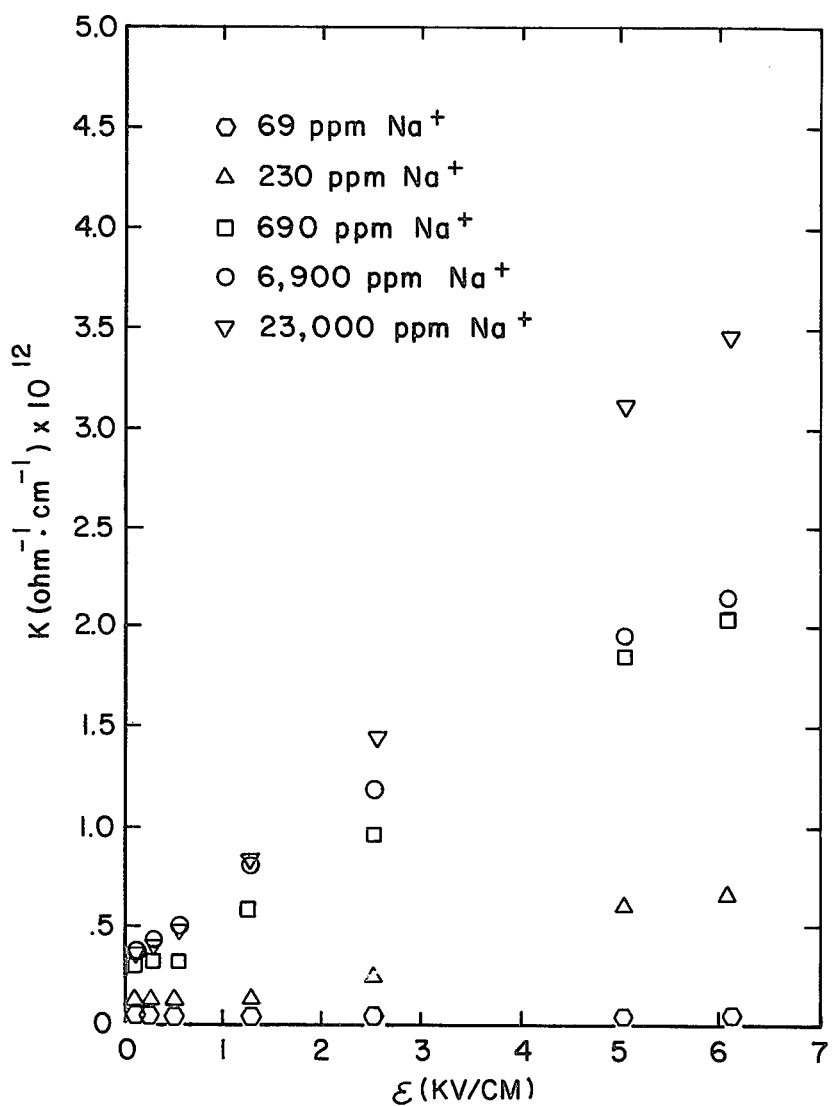

United States Patent [19]

Wingrave

[11] 4,230,604

[45] Oct. 28, 1980

[54] POLYMERIC ELECTRICAL CONDUCTANCE DEPENDENT UPON ELECTRICAL POTENTIAL

[75] Inventor: James A. Wingrave, Ponca City, Okla.

[73] Assignee: Conoco, Inc., Ponca City, Okla.

[21] Appl. No.: 955,833

[22] Filed: Oct. 30, 1978

[51] Int. Cl.³ .............................................. H01B 1/06
[52] U.S. Cl. ..................................... 252/518; 252/519
[58] Field of Search ................ 252/518, 519, 511, 510

[56] References Cited

U.S. PATENT DOCUMENTS

| | | | |
|---|---|---|---|
| 3,867,315 | 2/1975 | Tigner et al. | 252/518 X |
| 3,951,582 | 4/1976 | Holub et al. | 252/511 X |
| 4,084,034 | 4/1978 | Jansma et al. | 252/518 X |

Primary Examiner—Richard E. Schafer
Assistant Examiner—J. L. Barr
Attorney, Agent, or Firm—Cortlan R. Schupbach, Jr

[57] ABSTRACT

Polymers can be made semi-conductors by incorporating ionic metallic salts into said polymers, such that conductance levels rise more rapidly than normal as electrical potential increases. These salts are useful at levels of at least 0.007% by weight based on the total compound weight, said salts imparting a geometrically increased level of conductance as the applied electrical potential proportionally increases.

6 Claims, 4 Drawing Figures

POLYMERIC ELECTRICAL CONDUCTANCE DEPENDENT UPON ELECTRICAL POTENTIAL

This invention relates to a method for imparting increased electrical conductance to polymers. More specifically, this invention relates to a method for imparting increased electrical conductance to polymers by incorporating into said polymers at least .007% by weight of a highly ionic metallic salt, said incorporation imparting a geometrically increased rate of conductance as the applied electrical potential proportionally increases.

The addition of metal salts to polymers is known. For example, USSR Pat. No. 335,957 teaches that the thermostability of plastics can be increased by adding from 0.001 to 0.5% stannous chloride, lead chloride, zinc chloride, or cadmium chloride. The reference does not show using metal salts for the purpose of making polymers' electrical conductance dependent upon electrical potential. Polymers such as polyvinyl chloride can be made electro-conductive by the addition of silver, carbon black, metal oxides, iron, brass, copper, or nickel. However, the art does not describe conductance dependent upon electrical potential.

Deviations of electrolytic solutions from Ohm's law under high field strengths have been called the Wien effect since these interesting and informative properties were discovered by Max Wien in 1927. Wien discovered that the conductivity of an electrolytic solution increases with increasing field strength when very high electrical fields are applied, such that under extreme conditions Ohm's law was no longer valid. This discovery has long been known for development of the theory of electrolytic solutions, but has not heretofore been applied to polymers. Explanation of the Wien effect can be found in Chemical Review, volume 24, pages 367 through 414, 1939 by Eckstrom and Schmelzer.

A polymeric compound which has enhanced electrical current flow for electric fields would have many useful properties. In particular, this property would find applications in remote voltage sensing devices, particularly where large voltages across very small distances must be measured. The large current response per change in electric field would provide increased measurement sensitivity and the inherently high resistivity of polymers and resins would give this material, unique properties not readily obtainable in most dielectrics, which do not provide both properties simultaneously.

It would therefore be of great benefit to provide a method for producing polymers having electrical conductance dependent upon electrical potential.

It has now been discovered according to the instant invention that increased electrical potential can be imparted to normally insulating polymers by incorporating into the polymer at least 0.007% by weight of a highly ionic metallic salt, said salt imparting a geometrically increased rate of conductance as the applied electrical potential proportionally increases.

Incorporation of the ionic metallic salts as described above produces an organic compound which has enhanced electrical current flow for electrical fields in the 1 to 10 KV/cm range. The compound so prepared could be used, for example, for voltage measurements over varying voltage ranges.

Voltage measurements over varying electrical ranges could be measured by simply varying the thickness of the organic compound.

The highly ionic metallic salt used is any which will impart the properties of electrical conductance dependent upon electrical potential to the resin. Normally, these metallic salts will be sulfate or halide salts ionically bonded to metals such as sodium, zinc, iron, potassium, and so forth. Representative examples of such metallic, ionic salts are sodium chloride, zinc chloride, ferric sulfate, zinc sulfate, and sodium sulfate.

In addition to the ionic metallic salts, the resin or polymer can contain other compounding materials such as additives and reinforcing materials. Examples of such materials are metal oxides, pigments, fillers, softening agents, antioxidants, plasticizing agents and so forth.

Representative examples of resins and polymers which can be modified according to the instant invention are homopolyester and copolyesters such as poly(ethylene terephthalate), poly(tetramethylene terephthalate), 80/20 poly(tetramethylene terephthalate/isophthalate); natural rubber, gutta percha, balata, and rubbery synthetic polymers containing carbon to carbon double bonds; butyl rubber which is a polymerization product of a major proportion of a multiolefins such as butadiene or isoprene, polychloroprene; homopolymers of a conjucated 1,3-diene such as isoprene and butadiene containing up to 50% by weight of at least 1 co-polymerizable monomer such as styrene and/or acrylonitrile; polypropylene, polyethylene, polypropylene oxide, ethylene/propylene copolymers, and terpolymers of ethylene/propylene and a non-conjugated diene; vinyl monomers such as polyvinyl chloride, homopolymers and copolymers, other vinyl resins, represented by esters of unsaturated alcohols such as allyl, 1-chloroallyl, and 2-chloroallyl, unsaturated acids such as acrylic and methacrylic and other alpha-substituted acrylic acids, unsaturated poly basic acids such as maleic and fumaric; esters of saturated alcohols with unsaturated aliphatic monobasic and polybasic acids; vinyl cyclic compounds including monovinyl aromatic hydrocarbons, such as styrene and chlorostyrenes, divinylbenzenes and n-vinyl pyrrolidone; unsaturated ethers (allyl or aryl vinyl ethers) such as methyl vinyl ether and cetyl vinyl ether, unsaturated amides such as acrylamide, diacetone acrylamide, vinyl halides, such as vinyl fluoride, vinyl bromide, vinylidene chloride and allyl chloride, unsaturated nitriles such as acrylonitrile, methacrylonitrile, and alpha-chloryl acrylonitrile. Other vinyl monomers which can be used are vinyl acetate, benzophenone, glycidyl acrylate, and methacrylate, hydroxypropyl acrylate, hydroxy ethyl acrylate, glycidyl methacrylate, vinyl propionate, propylene, isobutylene, and ethylene. The above monomers could, of course, be polymerized to yield homopolymers or copolymers with vinyl chloride and other monomers.

Thus it has been discovered that when organic resins and polymers compounded with large amounts of inorganic highly ionic metallic salts, the electrical conductance of the resultant compound becomes very dependent upon the electrical potential applied across the compound. This is an unexpected result since the inorganic salt concentrations below about 70 parts per million do not show this behavior (350 parts per million for diionic salts and 700 parts per million for triionic salts). However, at greater salt concentrations, the conductance dependent on potential property clearly is manifest.

While no proven scientific explanation for this phenomena exists, a theory has been formed as to the reason for such an effect. It is emphasized that this is a hypothesis only and Applicant is not bound thereby. In formulating this hypothesis, electrical resistance of polyvinyl chloride compounds containing varying amounts of inorganic electrolytes was measured. The electrolyte ion was found to conduct through the polyvinyl chloride compound in a manner analogous to electrolyte conduction in liquids. Compounds containing greater amounts of electrolyte ions showed Debye-Hückel activity behavior.

The electrical conductance of the compounds containing low to moderate electrical concentrations (below about 70 parts per million) increased directly with the applied electrical potential (100 to 5,000 volts per centimeter) in agreement with Ohm's law. However, compounds with large electrolyte concentrations showed electrical conductances far in excess of those predicted by Ohm's law. This behavior is termed in Wien effect. Calculations of Debye-Hückel ionic atmosphere radii and Bjerrum ionic association radii (as described in the *Physical Chemistry of Electrolytic Solutions*, by Harned and Owen, 2nd Edition, Reinhold Corp. 1950 pages 42 through 45) indicates that ion association energies tend to disrupt the Debye-Hückel ionic atmosphere which, in turn, enhances ion mobility as a function of applied electrical potential.

The invention is more concretely described with reference to the examples below wherein all parts and percentages are by weight unless otherwise specified. The examples are provided to illustrate the instant invention and not to limit it.

Polyvinyl chloride homopolymer resin was used in the experimental work set forth below.

EXAMPLE 1

Polyvinyl chloride plaques were prepared having the following compounding recipe.

| | |
|---|---|
| Polyvinyl chloride resin | 150 parts |
| Di-(2-ethylhexyl)phthalate | 75 parts |
| Number 33 clay | 22.5 parts |
| Basic Lead Stabilizer | 7.5 parts |
| Stearic acid | .38 parts |
| Inorganic salt | varied to determine effect |

The materials were milled together on a 6 inch by 12 inch 2 roll mill at 162° C. for 10 minutes. The recipe was sheeted out to a thickness of from 0.070 inches to 0.075 inches.

After the sheet was obtained from the mill, the 6 inch by 6 inch sheet was pressed polished at 170° C. and 1.5 tons per square inch. Two 3-inch diameter plaques were then cut from the milled sheet and thicknesses measured. The plaques were equilibrated at 50% relative humidity at 21° C. for 2 days, then individually conditioned at 50° C. for ½ hour.

The potentials of the various plaques were then obtained using the following procedure. All PVC resins used were commercial grade CONOCO resin 5425 (manufactured and sold by Continental Oil Company) with a specific viscosity of 0.432 as measured in nitrobenzene at 25° C. Electrical conductance measurements were made with a 6105 resistivity adapter (manufactured and sold by Keithley Instruments, Inc.) connected to a 610C Keithley electrometer and powered by a 240A high voltage supply. The plaques and resistivity adapter were maintained at 50°±1° C. for 30 minutes prior to each measurement and 810 research chromatograph oven (manufactured and sold by R&M Scientific Corporation). The electrical conductance measurements were made on 3 inch diameter polyvinyl chloride plaques using the following procedure:

(1) The plaque was placed at 50° C.±1° for 30 minutes (2) The plaque was placed between the electrodes for 60 seconds;

(3) The plaque was electrified at the lowest voltage and current was recorded as a function of time for 60 seconds. Since a slight current drift of time at constant voltage occurs with electrical conductance in PVC plaques, the electrical resistance values were all calculated from the current extrapolated to zero time from the current/time data.

(4) After 60 seconds of electrification, the polarity was reversed for 15 seconds;

(5) The electric current was terminated for 45 seconds during which time the voltage supply was adjusted to the next higher voltage;

(6) The plaque was electrified and the current was recorded as a function of time;

(7) Steps 4 through 6 were repeated for all voltages of interest.

Figure 2:
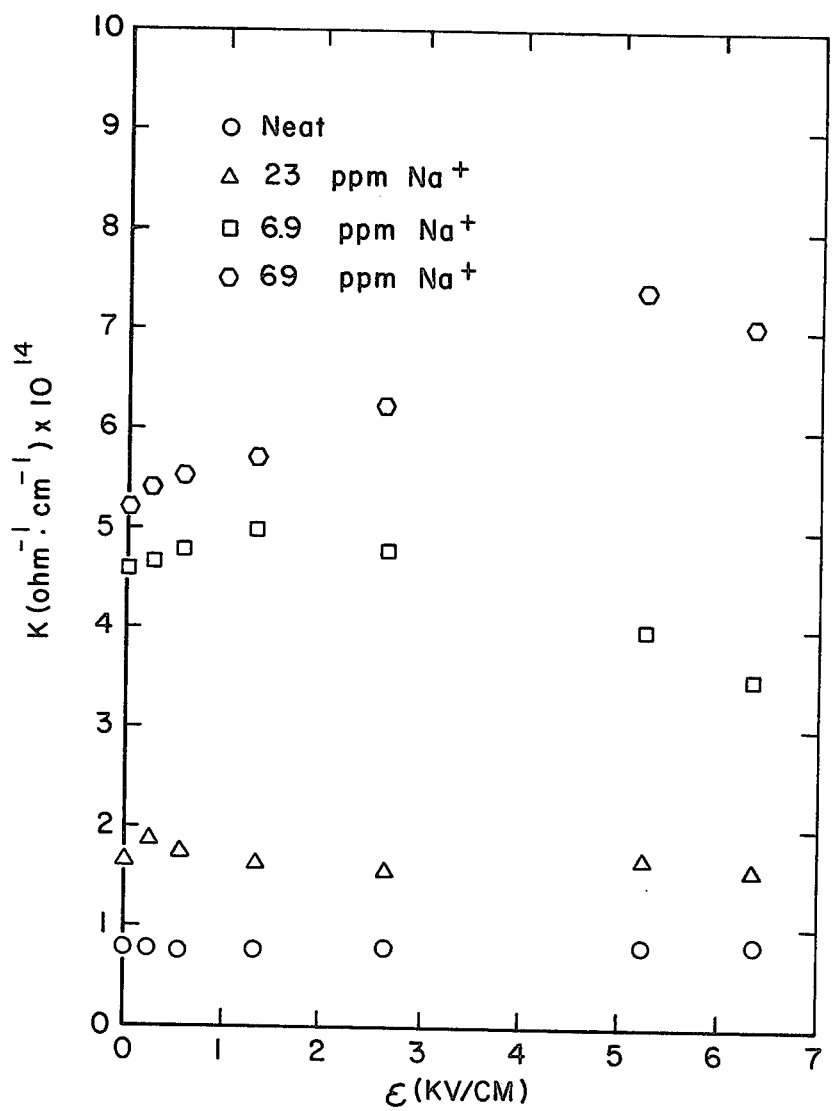

It was discovered that Ohm's law predicts conductance at salt concentrations below about 70 parts per million, and that a geometrically increased rate of conductance was obtained as applied electrical potential proportionately was increased for inorganic salt concentrations above about 70 parts per million. This relationship is graphically illustrated for one example in FIG. 1 wherein the salt used was sodium chloride and polyvinyl chloride homopolymer. FIG. 2 also shows sodium chloride and polyvinyl chloride homopolymer and shows that specific conductance at low concentrations does not increase beyond levels predicted by Ohm's law.

Figure 3:
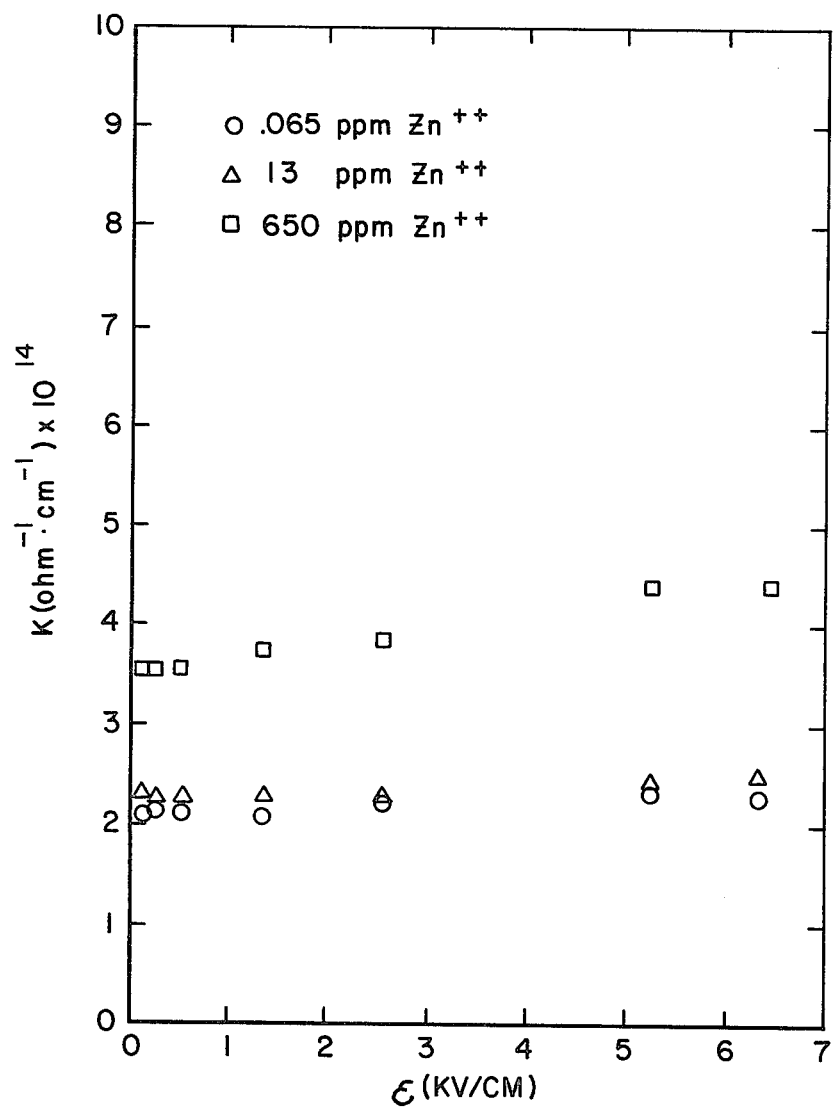
Figure 4:
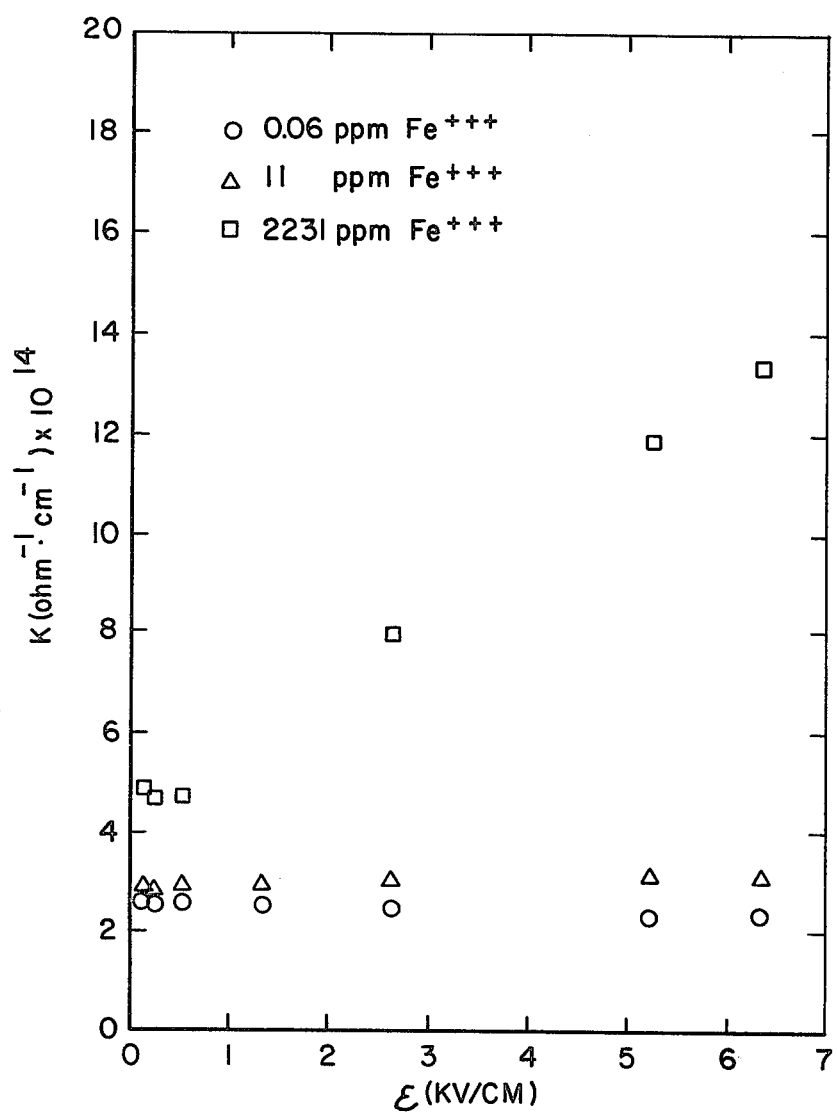

FIG. 3 shows zinc chloride at various concentrations. The scale is magnified to show salt effects. FIG. 4 shows ferric chloride at various concentrations. The scale of FIG. 4 is also magnified. The higher concentration necessary for the salts of FIGS. 3 and 4 to increase conductance is shown.

The ionic characteristics of the salt used to impart electrical conductance are extremely important. The behavior of the salt can be predicted from the valence of the metal used. The conductance imparted is a function of the square of the valence; thus, the amount of zinc chloride used must be two and one-half times the amount of sodium chloride ($1^2+1^2=2$) since zinc has a valence of 2 ($2^2=4$) and chlorine has a valence of 1 ($1^2=1$; $4+1=5$). For ferric chloride, the amount needed is five times that of sodium chloride ($3^2+1^2=10$) as is illustrated in the Figures. The Figures report volume conductivity since volume conductivity and volume resistivity are material properties which are independent to the geometry of the conductor as opposed to resistance and conductance which are highly geometry dependent. The figures clearly illustrate that at salt levels of at least 0.007% by weight based on the total compound weight, salts impart a geometrically increased level of conductance as the applied electrical potential proportionally increases. Higher concentration levels are necessary for salts whose ionic valence is higher.

Thus it is apparent that semi-conductor properties can be imparted to organic resins by incorporating therein above 70 parts per million of an inorganic metallic ionic salt such that electrical conduction increases geometrically as electrical potential proportionally increases.

In the preferred invention polyvinyl chloride compounds, whether homopolymers or copolymers are preferred. Preferred inorganic metallic ionic salts are sodium chloride zinc chloride, ferric sulfate, zinc sulfate and sodium sulfate. Normally, the salt concentration will range from about 0.007% by weight to about 5% by weight, although from about 0.6% by weight to about 5% by weight is most preferred. Diionic salts are most useful at levels of at least 0.0175% by weight and triionic salts are most useful at levels of at least 0.035% by weight.

While certain embodiments and details have been shown for the purpose of illustrating this invention, it will be apparent to those skilled in this art that various changes and modifications may be made herein without departing from the spirit or scope of the invention.

I claim:

1. A method for imparting increased electrical conductance to organic resins and polymers comprising incorporating into said resins and polymers at least 0.007% by weight of an inorganic highly ionic monovalent metallic salt, 0.035% by weight of an inorganic highly ionic bivalent metallic salt or .07% by weight of an inorganic highly ionic trivalent metallic salt, said salt imparting a geometrically increased rate of conductance as the applied electrical potential proportionately increases.

2. A method for forming a polyvinyl chloride semiconductor by incorporating into the polyvinyl chloride at least 0.007% by weight of an inorganic highly ionic monovalent metallic salt, 0.035% by weight of an inorganic highly ionic bivalent metallic salt, or 0.07% by weight of an inorganic highly ionic trivalent metallic salt, said salt imparting a geometrically increased rate of conductance as the applied electrical potential proportionately increases.

3. A method as described in claim 1 wherein the inorganic highly ionic metallic salt is a sulfate or halide salt.

4. A method as described in claim 3 wherein the resin or polymer is selected from the group consisting of polyvinyl chloride homopolymers and copolymers.

5. A method as described in claim 4 wherein the salt is selected from the group consisting of sodium chloride, zinc chloride, ferric sulfate, zinc sulfate and sodium sulfate.

6. A method as described in claim 5 wherein the salt concentration in the polymer is from about .007% by weight to about 5% by weight.

* * * * *